(12) United States Patent
Armes

(10) Patent No.: US 6,406,634 B1
(45) Date of Patent: Jun. 18, 2002

(54) POLLUTION CLEANUP SYSTEM AND METHOD

(76) Inventor: Roderick A. Armes, 7630 N. Fox Hollow Rd., Bloomington, IN (US) 47408

( * ) Notice: Subject to any disclaimer, the term of this patent is extended or adjusted under 35 U.S.C. 154(b) by 0 days.

(21) Appl. No.: 09/872,919

(22) Filed: Jun. 4, 2001

(51) Int. Cl.[7] .................................................. C02F 1/00
(52) U.S. Cl. ........................ 210/739; 210/767; 210/805
(58) Field of Search ................................. 210/739, 767, 210/805, 194, 241, 244, 258, 416.1; 55/356, 383

(56) References Cited

U.S. PATENT DOCUMENTS

| | | | |
|---|---|---|---|
| 4,839,061 A | * | 6/1989 | Manchak, Jr. et al. |
| 4,846,967 A | * | 7/1989 | McGehee |
| 5,073,259 A | * | 12/1991 | Solimar |
| 5,340,471 A | * | 8/1994 | Wilson et al. |
| 6,022,473 A | * | 2/2000 | Mickelson |

* cited by examiner

Primary Examiner—Betsey Morrison Hoey
(74) Attorney, Agent, or Firm—Daniel J. O'Connor

(57) ABSTRACT

A pollution cleanup system and method is especially useful for the on-site treatment of polluted water. The system includes a filter media, a pump, a holding tank and valves for operation of the system. Polluted water is passed through the filter media and cleaned. It is then tested for purity and passed, for example, into a storm drain. If needed for further cleaning, the water may be recycled through the filter media.

1 Claim, 2 Drawing Sheets

POLLUTION CLEANUP SYSTEM AND METHOD

BACKGROUND AND OBJECTS OF THE INVENTION

Figure 1A:
Figure 1B:
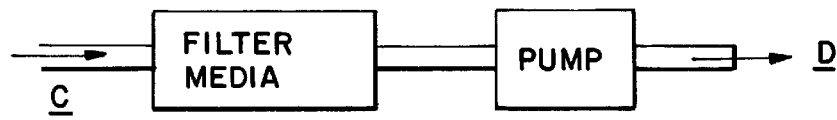
Figure 1C:
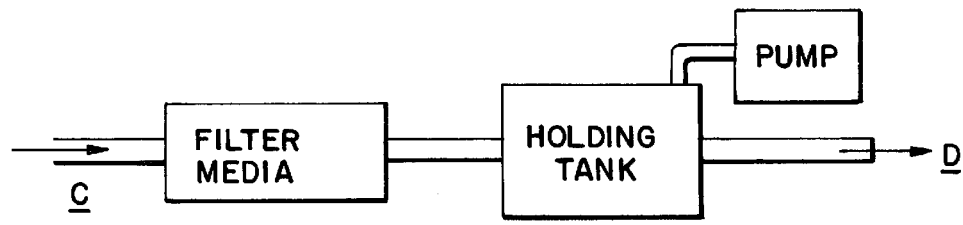
Figure 1D:
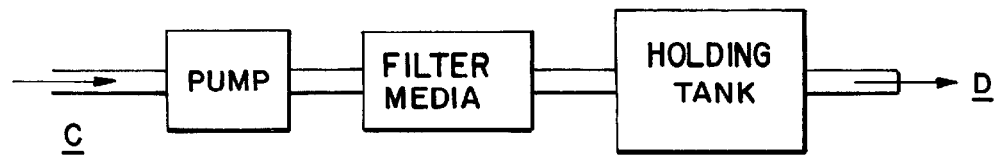
Figure 1E:
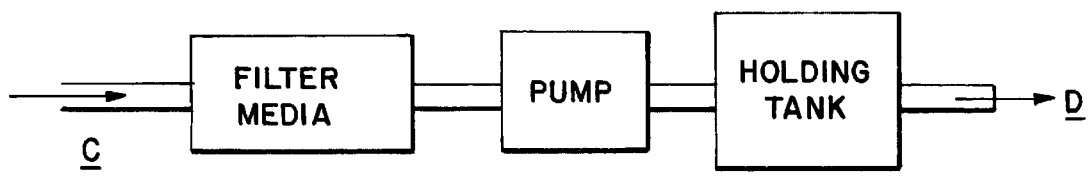

The present invention is generally related to the pollution cleanup arts and, in particular, to the recovery and cleaning of storm water caught in areas where the water has become contaminated.

Such contamination results from the water being mixed with chemicals, fuels and other pollutants found in containment basins, sumps, manholes, dikes or any other area where storm water runs off into an area designed to contain the release of these pollutants into the ground or water.

In current practice, the standard way of dealing with the above problems is the pumping of water and pollutants into a holding tank, vessel or drums and then hauling it to a treatment facility to be processed.

Such process does achieve the desired cleanup but is very time consuming and costly because of the extensive hauling of hazardous materials.

Accordingly, it is an object of the present invention to set forth a novel system and method which combines the currently existing technology of pumping, either with pumps or vacuum systems, with the newly developed filtering technology which allows water to be pumped through the filtering media to remove the pollutants.

Thus, the storm water is cleaned to an acceptable level and may then be released into the storm or sanitary sewer system.

Importantly, such reduces the need to haul contaminated, hazardous water off-site to a reclamation facility. Thus, time and money are saved and the storm water is returned to the environment quickly and safely.

The principles described herein have utility on land or water and may be effectively utilized for smaller or larger cleanup systems, i.e. pumping equipment from the smallest to the largest currently used in the art.

The following objects and advantages are also achieved in the practice of the invention:

- Recovery of run-off water from containment basins at sites where the purpose of those basins is to contain hazardous materials and/or contaminants related to production, delivery and storage of same. These sites would include but not be limited to: industrial, chemical and petroleum factories, gasoline stations, petroleum bulk plants, car washes, and other polluted environments.
- Cleanup of waterways and bodies of water where spills of contaminants have been released.
- Use of the filter media with the bilge pump on boats or ships.

These and other objects and advantages of the present invention will be apparent to those of skill in the art from the description which follows.

PRIOR ART PATENTS AND DESIGNS

During the course of preparing the specification for submission to the U.S. Patent Office, a search of the pollution cleanup prior art was conducted.

U.S. Pat. No. 6,158,924 teaches the use of a method for decontaminating well water including a vacuum pumping unit.

U.S. Pat. No. 5,265,978 teaches an on-site system to clean soil.

While these systems are broadly related to the present invention, the system and method disclosed herein are believed to be clearly patentable over all known prior art systems.

SUMMARY OF THE INVENTION

The invention comprises a system and method for decontaminating polluted water and includes filter media and a pump element which may be used in conjunction with a holding tank.

A discharge valve element in the holding tank allows discharge of cleaned water into a storm drain or other equivalent area.

The system and method include an aperture in the holding tank to permit access and testing of the collected water.

If desired, collected water may be recycled through the filter media again for a more thorough cleaning.

BRIEF DESCRIPTION OF THE DRAWING FIGURES

FIGS. 1(a) through 1(e) broadly show various arrangements for the pump, filter and holding tank devices of the invention.

Figure 2:
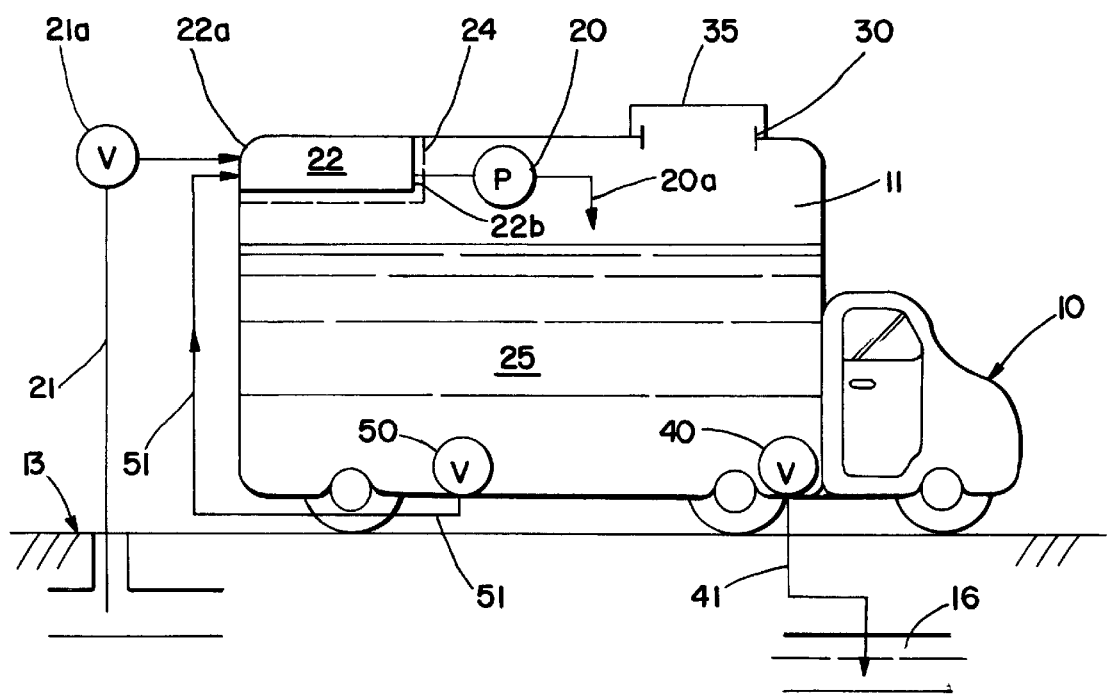

FIG. 2 shows a transportable holding tank 11 in association with a truck 10 and an associated cleanup system and method for treating polluted materials.

DESCRIPTION OF THE PREFERRED INVENTION EMBODIMENTS

Referring to the drawing figures, FIGS. 1(a) through 1(e) broadly show a number of different systems for converting contaminated water C into acceptably clean discharge water D which may be fed, for example, into a storm drain.

As indicated in the figures, the pump, filter media and holding tank, if part of the system, may be utilized in differing orders and different hook-up patterns in order to achieve the best possible system application.

FIG. 2 illustrates an embodiment of the invention wherein a holding tank 11 is delivered to a contaminated area 13 by means of truck 10.

The holding tank 11 has a filter media 22 placed therein with inlet 22a and outlet 22b. An access door, indicated by the dashed lines at 24, allows the filter 22 to be changed when needed.

A pump 20 is positioned at the exit of the filter media. Pump 20 has a discharge 20a into the holding tank 11 as shown.

As further shown in FIG. 2, a line or hose 21 is connected to the inlet of the filter media 22. Line 21 may have an open-close valve if needed.

Thus, upon operation of the pump 20, fluid from a contaminated area 13 is passed through the filter media and into holding tank 11. The filtered fluid is shown at numeral 25.

An opening 30 and covering lid 35 are located on the holding tank 11 and such may be used to access the fluid 25 for the purpose of testing the purity levels of said fluid.

When the fluid 25 is determined to be sufficiently clean, it may be passed out of tank 11 via valve 40 and line 41 into a storm drain 16 or other suitable discharge area.

If the fluid 25 is determined to be of not sufficient purity levels, it may be recycled through the filter media 22 by means of valve 50 and line or hose 51.

If the need arises, the filter media 22 may be changed on-site by means of an access door 24 which is indicated by the dashed lines around the filter media.

The method steps inherent in the use of the system shown in FIG. 2 are as follows:

- transport of the holding tank 11 to a contaminated area or site 13,
- pumping contaminated fluid via pump 20 through a filter media 22 and into the holding tank,
- testing the cleaned fluid for purity by means of an access port 30,
- discharge of the cleaned fluid 25 via a valve 40 and line 41 to a suitable discharge area such as a storm drain.

The method steps further inherent in the disclosed structure and which may also be employed are:

- recycling fluid 25 through the filter media 22 by means of valve 50 and line 51,
- replacement of the filter media 22 via an access door 24 if such is deemed necessary.

The many advantages of the described system and method have been previously described and include the following:

- an economical cleaning of contaminated water on site (in situ) by means of advanced filtering media which have recently become available in the pollution control arts,
- a reduction in the amount of hazardous and contaminated materials which must be transported to distant decontamination centers at great expense.

The invention is further defined by the claims appended hereto.

While particular systems and methods have been described hereinabove, it is intended in this specification to cover all equivalent systems and methods of use which would reasonably occur to those of skill in the art.

The principles described herein have applicability to may different pollution treatment environments.

I claim:

1. A method of decontaminating water or other fluids comprising the steps of:

a) transporting a holding tank (11) to a contaminated area (13), b) pumping contaminated fluid (13) into said holding tank (11) by means of a pump (20) wherein said contaminated fluid passes through a filter media (22), c) discharging cleaned fluid (25) to a storm drain (16) or other suitable area by means of a discharge valve (40) and line (41), d) testing the cleaned fluid (25) prior to discharge by means of an aperture (30) formed in said holding tank (11), e) recycling said cleaned fluid (25) through said filter media (22) if needed by means of a valve and line (50,51) connected to an inlet of said filter media and replacing said filter media if needed.

* * * * *